US009050669B2

(12) United States Patent
Coakley

(10) Patent No.: US 9,050,669 B2
(45) Date of Patent: Jun. 9, 2015

(54) RAPIDLY RETRACTABLE TOOL SUPPORT FOR A PIPE MACHINING APPARATUS

(71) Applicant: Illinois Tool Works Inc., Glenview, IL (US)

(72) Inventor: Roy C. Coakley, Northlake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 206 days.

(21) Appl. No.: 13/796,277

(22) Filed: Mar. 12, 2013

(65) Prior Publication Data

US 2014/0096655 A1    Apr. 10, 2014

Related U.S. Application Data

(60) Provisional application No. 61/709,514, filed on Oct. 4, 2012.

(51) Int. Cl.
| | |
|---|---|
| *B23B 1/00* | (2006.01) |
| *B23D 21/04* | (2006.01) |
| *B23B 5/08* | (2006.01) |
| *B23B 5/14* | (2006.01) |
| *B23B 5/16* | (2006.01) |

(52) U.S. Cl.
CPC ........... *B23D 21/04* (2013.01); *Y10T 82/16016* (2015.01); *Y10T 82/16475* (2015.01); *Y10T 82/16951* (2015.01); *Y10T 82/16442* (2015.01); *Y10T 82/22* (2015.01); *Y10T 82/2512* (2015.01); *Y10T 82/125* (2015.01); *B23B 5/08* (2013.01); *B23B 5/14* (2013.01); *B23B 5/163* (2013.01)

(58) Field of Classification Search
USPC ........ 82/47, 66, 128, 123, 1.2, 1.4, 113, 70.2, 82/72; 408/73–74
See application file for complete search history.

(56) References Cited

U.S. PATENT DOCUMENTS

| | | | |
|---|---|---|---|
| 2,364,963 A | 12/1944 | Elliott | |
| 2,635,270 A | 4/1953 | Dawson | |
| 4,318,391 A | 3/1982 | Wachs et al. | |
| 4,421,441 A * | 12/1983 | Hirose | ........................... 408/17 |

(Continued)

FOREIGN PATENT DOCUMENTS

| | | |
|---|---|---|
| DE | 900042 C | 12/1953 |
| DE | 2439852 A * | 3/1976 |

(Continued)

OTHER PUBLICATIONS

International Search Report and Written Opinion for PCT/US2013/062999 dated Jan. 29, 2014, 12 pages.

(Continued)

*Primary Examiner* — Daniel Howell
*Assistant Examiner* — Nicole N Ramos
(74) *Attorney, Agent, or Firm* — Klintworth & Rozenblat IP LLC

(57) ABSTRACT

Pipe machining apparatuses, tool supports, and methods of operating pipe machining apparatuses are provided. In one aspect, a pipe machining apparatus includes a frame, a tool carrier coupled to and movable relative to the frame, and a tool support coupled to and movable with the tool carrier relative to the frame. The tool support is adapted to support a tool and move the tool in a first direction toward a pipe at a first increment and move the tool in a second direction away from the pipe at a second increment. The second increment is larger than the first increment.

18 Claims, 7 Drawing Sheets

(56) References Cited

U.S. PATENT DOCUMENTS

| | | | |
|---|---|---|---|
| 4,483,223 A * | 11/1984 | Nall et al. | 82/113 |
| 4,490,909 A | 1/1985 | Wachs et al. | |
| 4,543,861 A | 10/1985 | Kwech et al. | |
| 4,655,108 A | 4/1987 | Galos | |
| 4,677,884 A | 7/1987 | Kwech et al. | |
| 4,739,685 A * | 4/1988 | Ricci | 82/113 |
| 4,762,038 A * | 8/1988 | Olson | 82/113 |
| 4,770,074 A * | 9/1988 | Kwech | 82/113 |
| 4,791,842 A | 12/1988 | Olson | |
| 4,880,340 A * | 11/1989 | Taki et al. | 408/176 |
| 4,939,964 A | 7/1990 | Ricci | |
| 5,002,440 A * | 3/1991 | Tamaoki et al. | 408/12 |
| 5,013,015 A | 5/1991 | Fatheree | |
| 5,054,342 A | 10/1991 | Swiatowy et al. | |
| 5,199,928 A * | 4/1993 | Gress et al. | 470/75 |
| 5,368,399 A | 11/1994 | Tremblay | |
| 5,549,024 A | 8/1996 | Ricci | |
| 5,954,462 A * | 9/1999 | Way et al. | 408/153 |
| 6,065,378 A | 5/2000 | Ricci | |
| 6,257,110 B1 | 7/2001 | Ricci et al. | |
| 2004/0035171 A1 | 2/2004 | Gormany | |
| 2004/0234352 A1 | 11/2004 | Vanderpol | |
| 2005/0132851 A1 * | 6/2005 | Place | 82/113 |
| 2006/0207395 A1 | 9/2006 | Place | |
| 2010/0162860 A1 | 7/2010 | Hall et al. | |

FOREIGN PATENT DOCUMENTS

| | | |
|---|---|---|
| DE | 3603618 C1 | 10/1987 |
| DE | 10020393 A1 | 2/2001 |
| DE | 10 2009 005983 A1 | 7/2010 |
| EP | 0819501 A1 | 1/1998 |
| FR | 2 641 487 A1 | 7/1990 |
| WO | 2012/071419 A1 | 5/2012 |
| WO | 2014/109910 A1 | 7/2014 |

OTHER PUBLICATIONS

International Search Report and Written Opinion for PCT/US2013/062987 dated Feb. 20, 2014, 11 pages.

International Search Report and Written Opinion for PCT/US2013/063007, dated Jan. 22, 2014, 14 pages.

International Search Report and Written Opinion for International Patent Application No. PCT/US2013/063023 dated Jun. 2, 2014, 16 pages.

International Search Report and Written Opinion for PCT/US2014/058814 dated Dec. 15, 2014, 9 pages.

\* cited by examiner

RAPIDLY RETRACTABLE TOOL SUPPORT FOR A PIPE MACHINING APPARATUS

RELATED APPLICATIONS

The present application claims the benefit of U.S. Provisional Patent Application No. 61/709,514, filed Oct. 4, 2012, the entire contents of which is incorporated herein by reference.

FIELD OF THE INVENTION

The present disclosure generally relates to pipe machining apparatuses and, more particularly, to pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are coupled together around the pipe. Such a pipe cutter includes a tool or cutting device that encircles the pipe and moves toward the pipe in small increments during the cutting process in order to slowly cut into the pipe. Eventually, after many small increments of adjustment toward the pipe, the pipe will be completely cut.

After completion of the cutting process, the cutting device must be retracted from its advanced cutting position. Due to the small increments of adjustment that are made to move the cutting device to its advanced cutting position, retraction of the cutting device is also made in small increments. This retraction of the cutting device is a very time consuming process.

It would therefore be desirable to retract the cutting device from the advanced cutting position in a manner requiring less effort and less time.

SUMMARY

The present disclosure is defined by the following claims, and nothing in this section should be taken as a limitation on those claims.

In one aspect, a pipe machining apparatus is provided and includes a frame, a tool carrier coupled to and movable relative to the frame, and a tool support coupled to and movable with the tool carrier relative to the frame. The tool support is adapted to support a tool and move the tool in a first direction toward a pipe at a first increment and move the tool in a second direction away from the pipe at a second increment with the second increment larger than the first increment.

In another aspect, a method of operating a pipe machining apparatus is provided. The method includes fixedly coupling a frame of the pipe machining apparatus to a pipe, moving a tool carrier relative to the frame with the tool carrier being coupled to the frame, advancing a tool coupled to the tool carrier toward the pipe at a first increment, and retracting the tool away from the pipe at a second increment larger than the first increment.

In a further aspect, a tool support for a pipe machining apparatus is provided. The tool support includes a rotatable feed screw and a tool clamp coupled to the feed screw and adapted to support a tool. The tool clamp is movable along the feed screw to move the tool in a first tool direction and a second tool direction. The tool support also includes a worm gear movable between a first position, in which the worm gear couples with the feed screw and rotation of the worm gear in a first worm gear direction rotates the feed screw to move the tool in the first tool direction and rotation of the worm gear in a second worm gear direction rotates the feed screw to move the tool in the second tool direction, and a second position, in which the worm gear is uncoupled from the feed screw and the feed screw is rotatable independently of the worm gear.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Methods and devices consistent with the present disclosure overcome the disadvantages of conventional pipe machining apparatuses by providing, among other things, a tool support that can rapidly retract a tool upon completion of machining a pipe.

Figure 1:
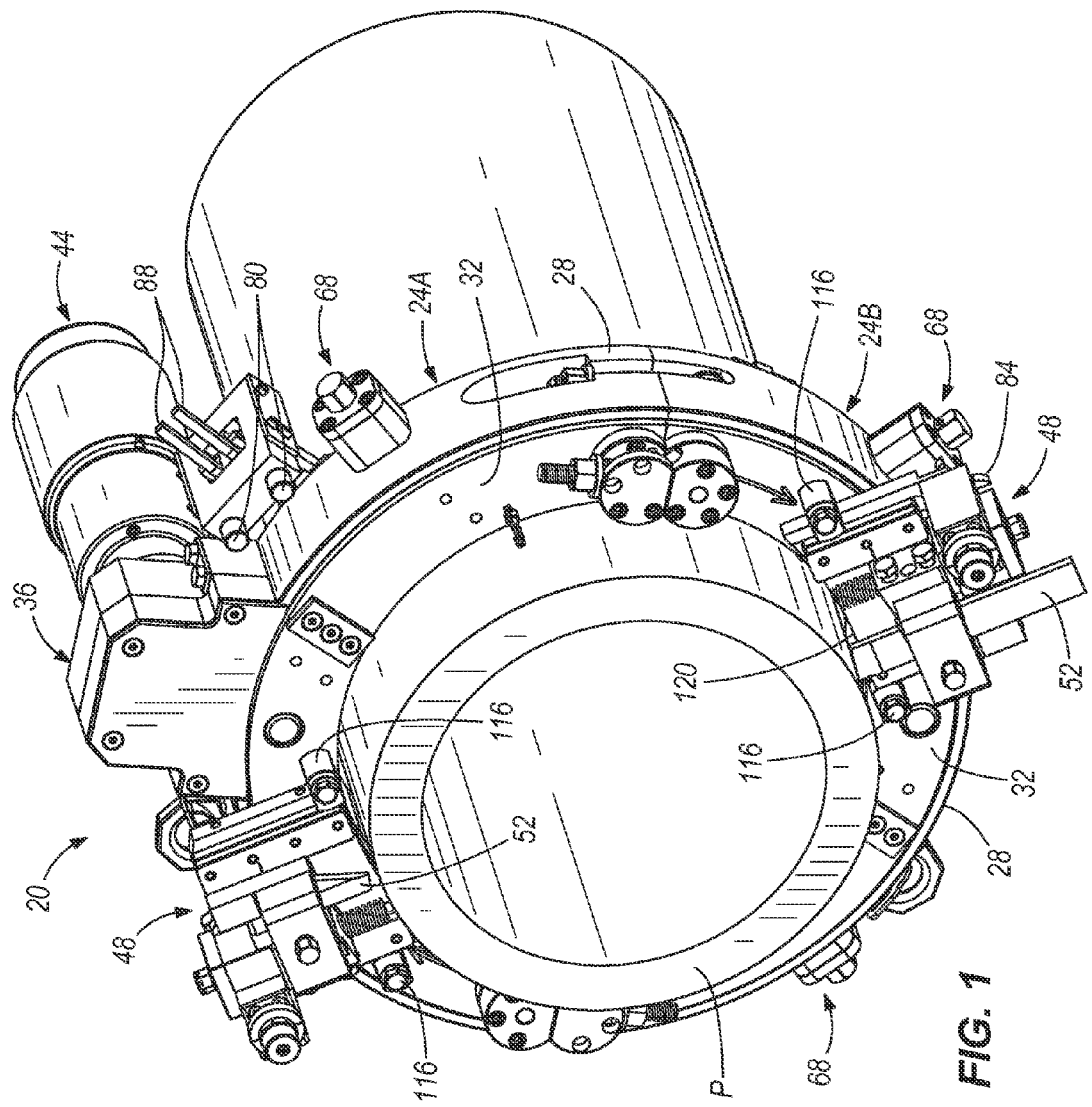
FIG. 1 is a top front perspective view of an exemplary pipe machining apparatus coupled to a pipe, in accordance with one embodiment.
Figure 2:
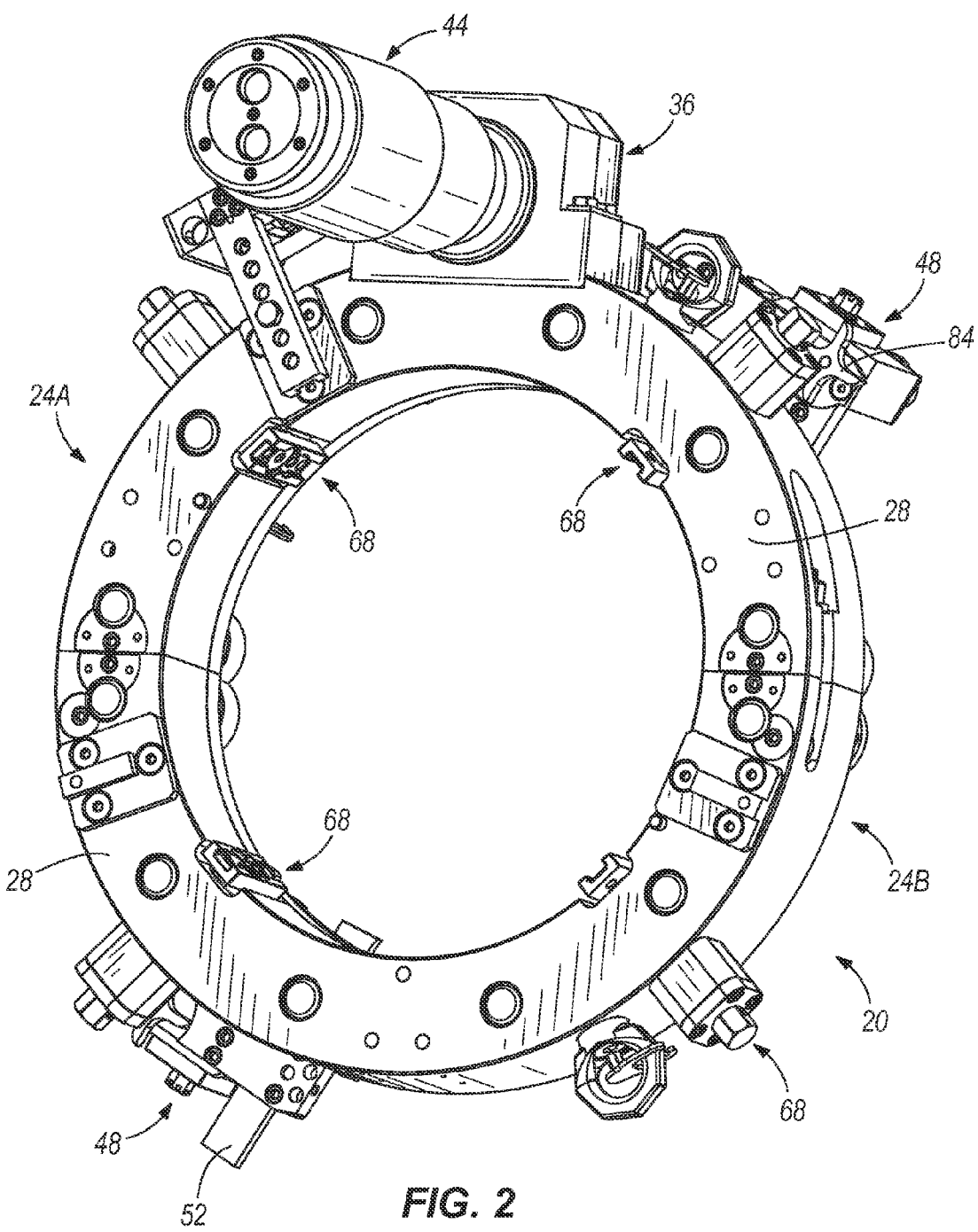
FIG. 2 is a bottom rear perspective view of the pipe machining apparatus illustrated in FIG. 1, in accordance with one embodiment.
Figure 3:
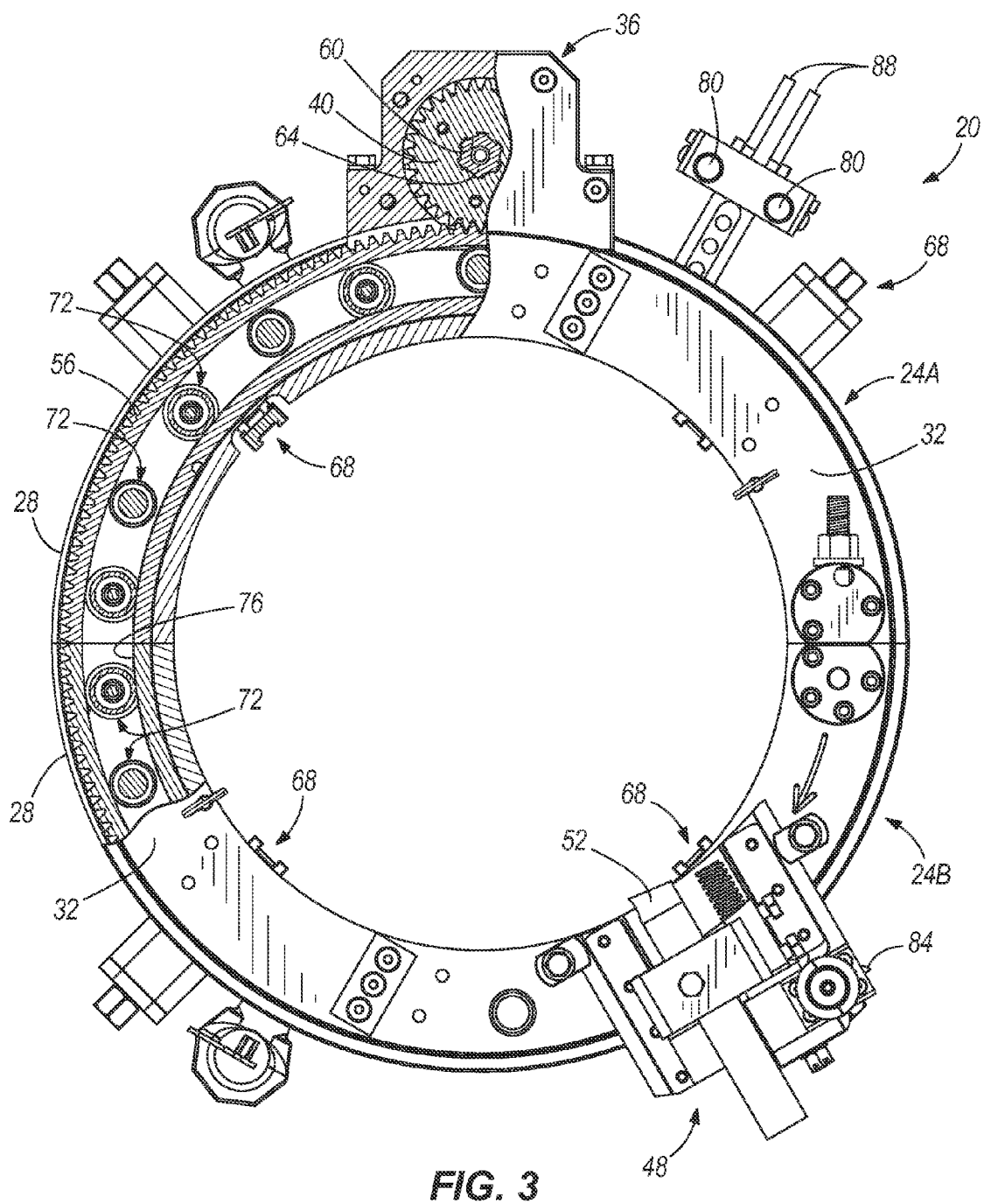
FIG. 3 is a front view of the pipe machining apparatus illustrated in FIG. 1 with a portion thereof broken away to show internal components of the pipe machining apparatus, in accordance with one embodiment.

With reference to FIGS. 1-3, there is shown one exemplary embodiment of a pipe machining apparatus 20 adapted to machine pipes P of varying diameters. In some exemplary embodiments, the apparatus 20 completely cuts through pipes P. In other exemplary embodiments, the apparatus 20 prepares an end of a pipe P for coupling to another pipe. In still other exemplary embodiments, the apparatus 20 both completely cuts and prepares a pipe P for coupling to another pipe.

In the illustrated exemplary embodiment, pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 is included in one section 24A and a second portion of the frame 28 and a second portion of the tool carrier 32 is included in the other section 24B. The frame 28 has a column 36 extending outwardly of the two semicircular sections 24A, 24B and houses a pinion gear 40 adapted to couple with a suitable drive motor 44, such as an air motor with suitable gear reduction means. The frame 28 is adapted to couple and be fixed relative to a pipe P, and the tool carrier 32 is rotatable relative to the fixed frame 28 and the pipe P. The air motor 44 is adapted to rotate the tool carrier 32 relative to the frame 28 through a gear train in the column 36. The tool carrier 32 has a circular gear rack 56 for meshing with the pinion gear 40 rotatably mounted in column 36. The pinion gear 40 has an opening 60 provided with a polygonal perimeter for receiving a complementary shaped drive head 64 of drive motor 44. Therefore, it can be seen that drive motor 44 is adapted to rotate tool carrier 32 relative to the frame 28 through a gear train provided by pinion gear 40 in column 36 and circular gear rack 56 on the tool carrier 32.

The rotatable tool carrier 32 includes one or more tool supports 48 (two tool supports shown in the illustrated exemplary embodiment), which support tools 52 for performing a cutting or machining operation on the pipe P as the tools 52 rotate circumferentially about the pipe P. The machining operation performed by the tool(s) 52 may form a straight edge perpendicular to a longitudinal extent of the pipe P, a bevel on an end of the pipe P that is transverse to the longitudinal extend of the pipe P and at an angle other than ninety degrees, or an edge of a pipe P having any angle.

The apparatus 20 further includes four adjustable clamp members or coupling members 68 engageable with an exterior of the pipe P and having suitable adjustability to couple and concentrically locate the apparatus 20 to the pipe P.

As best seen in FIG. 3, tool carrier 32 is rotatably mounted on and supported by frame 28 by a plurality of roller bearings 72. The roller bearings 72 ride in a circular bearing race 76 on the interior of tool carrier 32.

A plurality of projections 80 are adjustably movable into and out of a path of an advancement member 84 coupled to each tool support 48 to advance the tool 52 toward the pipe P. In the illustrated exemplary embodiment, the apparatus 20 includes a total of two projections 80 for engaging the advancement members 84, however, the apparatus 20 may include any number of projections 80. Each projection 80 is coupled to a lever 88 that may be actuated by a user to selectively move the projection 80 into and out of the path of the advancement members 84.

With continued reference to FIGS. 1 and 3, and further reference to FIGS. 4-7, a tool support 48 of the tool carrier 32 is illustrated in more detail. The tool support 48 includes a base 92, a feed screw 96 rotatably coupled to the base 92, a tool clamp 100 adapted to support a tool 52 and movable along the feed screw 96, a worm gear housing 104 coupled to the base 92, a worm gear assembly 108 supported by and at least partially positioned within the worm gear housing 104, a drive coupling 112 engageable with the worm gear assembly 108, and the advancement member 84 coupled to the drive coupling 112.

The tool support 48 is coupled to the tool carrier 32 by one or more coupling members 116 (two shown in the exemplary illustrated embodiment) and is adjustable relative to the pipe P to bring an arcuate edge 120 of the base 92 into contact with or in close proximity to an outer periphery of the pipe P. The tool clamp 100 is adapted to support a tool 52 and is movable along the feed screw 96 toward and away from the pipe P (depending on the direction of feed screw rotation). The feed screw 96 can have a variety of different tooth shapes, sizes, pitches, and configurations in order to provide a desired amount of tool movement during use of the apparatus 20. A drive gear 124 is coupled to the feed screw 96 and is engageable with the worm gear assembly 108 to transfer rotation of the worm gear assembly 108 to the feed screw 96. A tool coupling 128 such as, for example, a nut, is coupled to an end of the feed screw 96, thereby providing a location where a tool may couple to and rotate the feed screw 96 as desired.

The worm gear housing 104 defines a cavity 132 therein for receiving at least a portion of the worm gear assembly 108, the drive coupling 112, and the advancement member 84. The worm gear assembly 108 includes a shaft 136, a knob 140, a set screw 144, a housing 148, a first washer 152, a urethane washer 154, two thrust bearings 156, two bushings 160, a worm gear 164, and a key element 168. The worm gear 164 is fixed to the shaft 136 and, in some embodiments, the worm gear 164 may be unitarily formed as one-piece with the shaft 136. The worm gear 164 is coupled or interlaced with the drive gear 124, thereby causing the feed screw 96 to rotate when the worm gear assembly 108 rotates. The knob 140 is coupled to one end of the shaft 136 and the key element 168 is defined in a second end of the shaft 136. The key element 168 is adapted to engage with a similarly configured key feature 172 in the drive coupling 112, which is coupled to the advancement member 84. The key element 168 and complementary key feature 172 in the drive coupling 112 may have a wide variety of configurations. In the illustrated exemplary embodiment, the key element 168 includes a pair of projections 176 extending from an end surface of the worm gear 164. One projection 176 extends from the end surface on one side of the shaft 136 and a second projection 176 extends from the end surface on an opposite side of the shaft 136. The key feature 172 in the drive coupling 112 is comprised of a complementary shaped slot defined in an end of the drive coupling 112. The slot 172 is adapted to receive the key element 168 in an appropriate orientation and cause the worm gear assembly 108 and the drive coupling 112 to rotate together. In this manner, rotation of the advancement member 84 causes the worm gear assembly 108 to rotate.

Tool support 48 further includes rollers 180 engageable with a flange 184 of the worm gear assembly housing 148 and springs 188 engaging and applying constant force to the rollers 180. A pair of keeper plates 192 are coupled to the worm gear housing 104 to secure the rollers 180 and springs 188 in place, and each keeper plate 192 defines an aperture in which the associated roller 180 is positioned and retained. The worm gear assembly housing 148 is adapted to engage and roll over the rollers 180, with the rollers 180 applying a force to the flange 184. The flange 184 includes a pair of indentations 194 therein for receiving the rollers 180 when the worm gear assembly 108 is in the engaged position.

During operation of the apparatus 20, the motor 44 rotates the pinion gear 40, which, through engagement with the gear rack 56, causes the tool carrier 32 to rotate relative to the frame 28 and the pipe P. During tool carrier rotation, the advancement member 84 contacts the advancement projections 80 and rotates as a result, thereby rotating the worm gear assembly 108 due to the engagement between the key element 168 and key feature 172. Rotation of the worm gear 164 causes the drive gear 124 to rotate, which rotates the feed screw 96 to ultimately move the tool clamp 100 and tool 52 toward the pipe P to perform deeper machining into the pipe P. The tool 52 advances until the pipe P is machined to a desired extent (e.g., until the pipe is completely cut or parted).

After the desired amount of machining is achieved, it may be desirable to retract the tool 52 along the tool support 48 from the advanced cutting position. Tool retraction can be achieved in a couple manners. First, the knob 140 may be turned in an opposite direction to that for advancing the tool 52, thereby causing the worm gear assembly 108 to rotate in an opposite direction and also rotate the feed screw 96 in an opposite direction. The tool 52 and tool clamp 100 retract or move away from the pipe P when the feed screw 96 is rotated in the opposite direction. Due to the large ratio of the worm gear 164 and the drive gear 124, each complete rotation of the worm gear 96 assembly only retracts the tool 52 a small increment. Thus, many turns of the worm gear assembly 108 are required to retract the tool 52 a large amount. Retraction of the tool 52 in this manner can include a lot of effort and is time consuming. With the worm gear 164 and drive gear 124 engaged in the manner illustrated in FIG. 7, it is not possible to engage the tool coupling 128 on the feed screw 96 with a tool and rotate the feed screw 96 in the opposite direction without damaging the worm gear assembly 108 and/or the drive gear 124.

Figure 4:
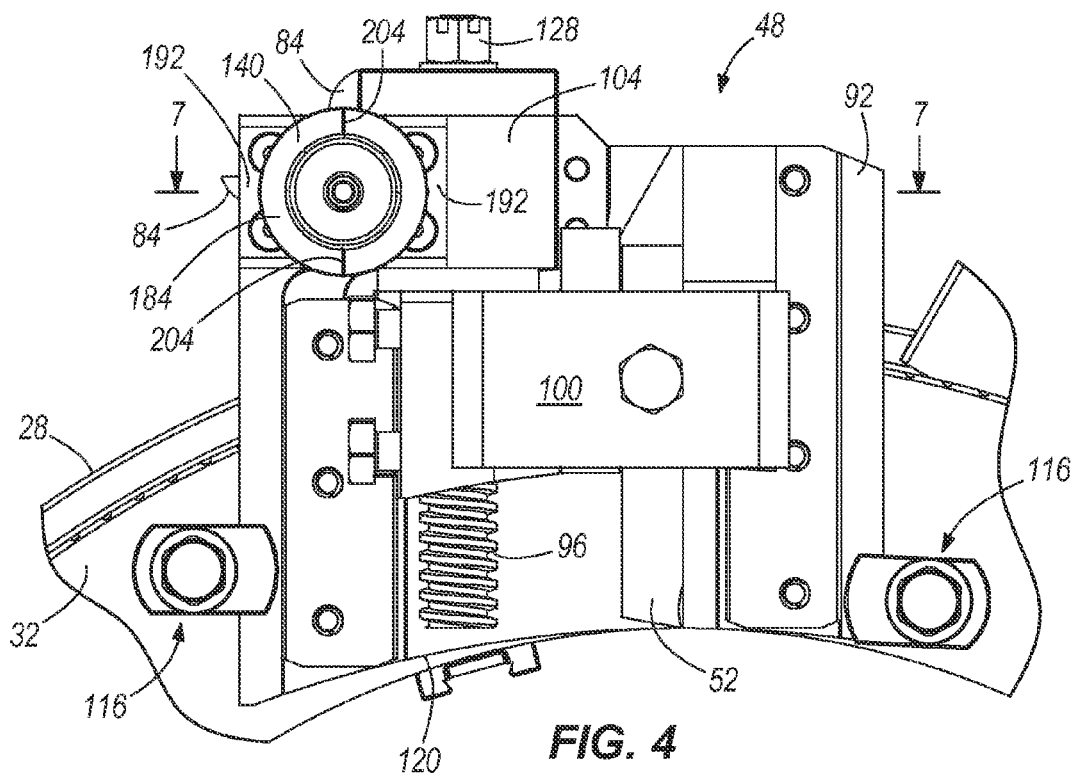
FIG. 4 is an enlarged front view of an exemplary tool support of the pipe machining apparatus shown in FIG. 1 with the tool support illustrated in an engaged position, in accordance with one embodiment.
Figure 6:
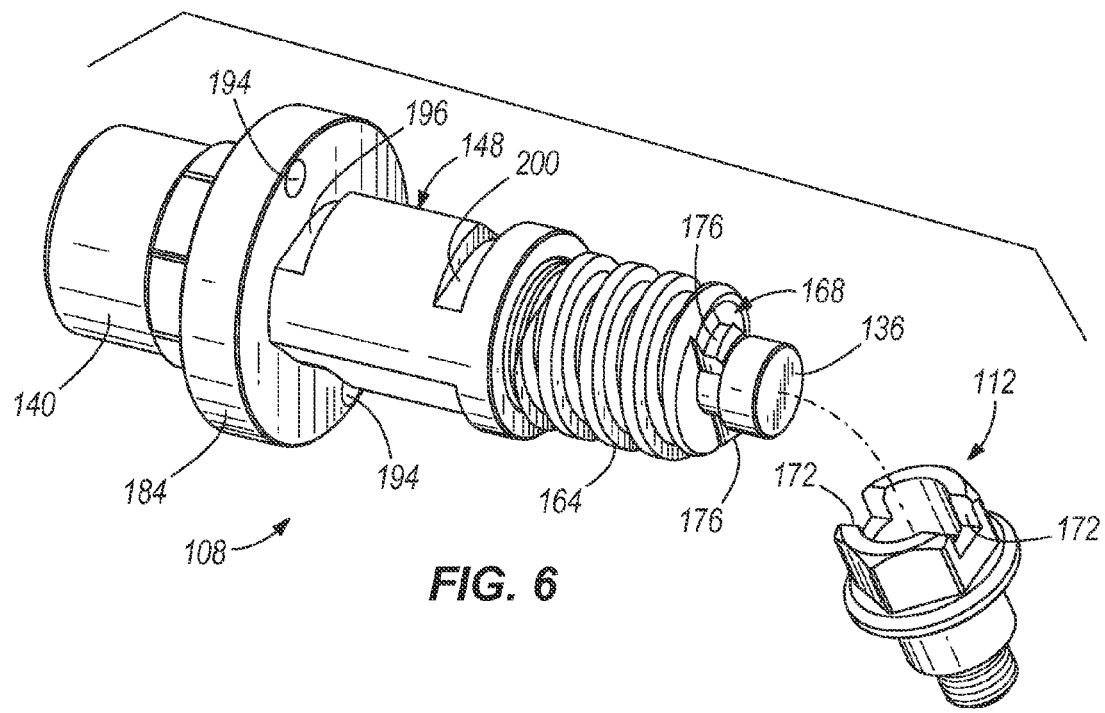
FIG. 6 is a perspective view of an exemplary worm gear assembly and an exemplary drive coupling of the pipe machining apparatus shown in FIG. 4, in accordance with one embodiment.
Figure 5:
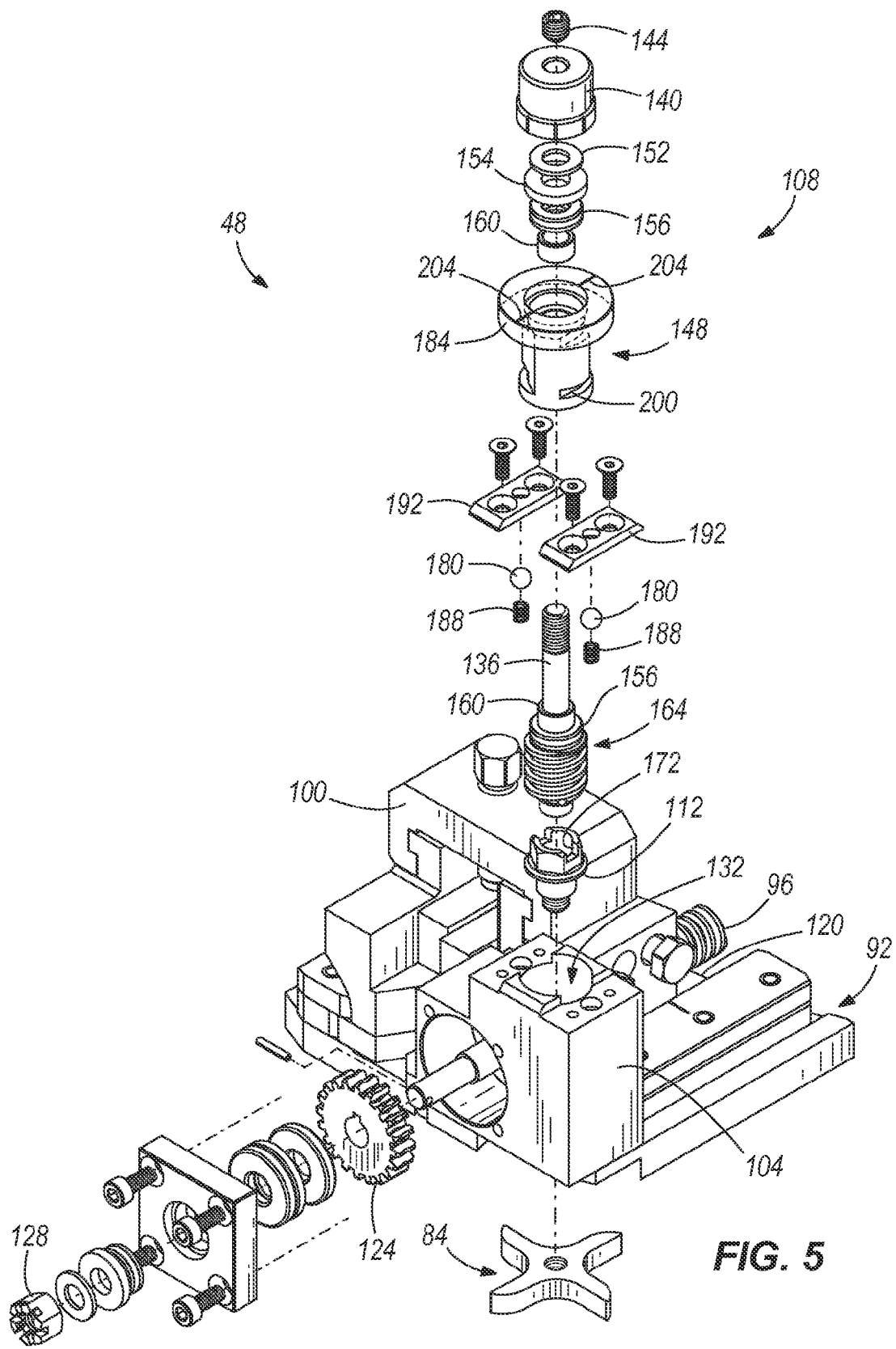
FIG. 5 is an exploded view of the tool support of the pipe machining apparatus shown in FIG. 4, in accordance with one embodiment.
Figure 7:
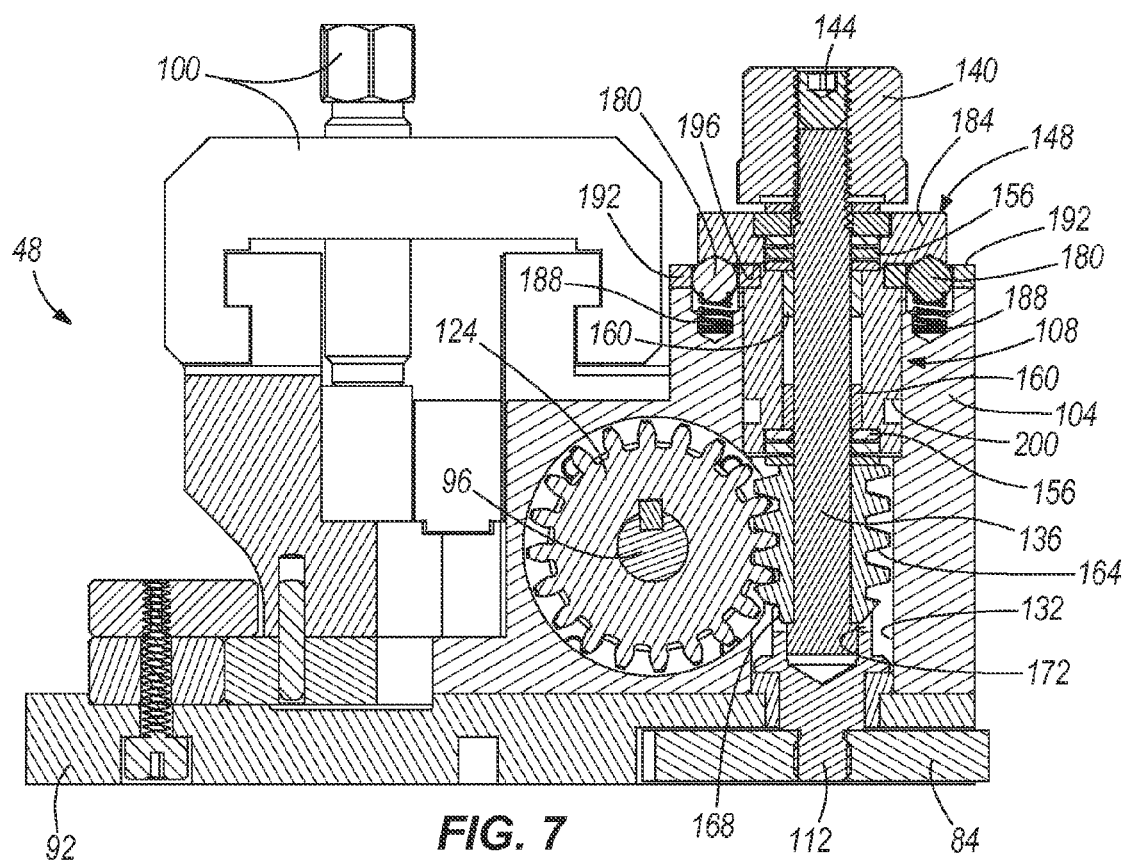
FIG. 7 is a cross-sectional view taken along line 7-7 in FIG. 4 showing the tool support of the pipe machining apparatus in an engaged position, in accordance with one embodiment.
Figure 8:
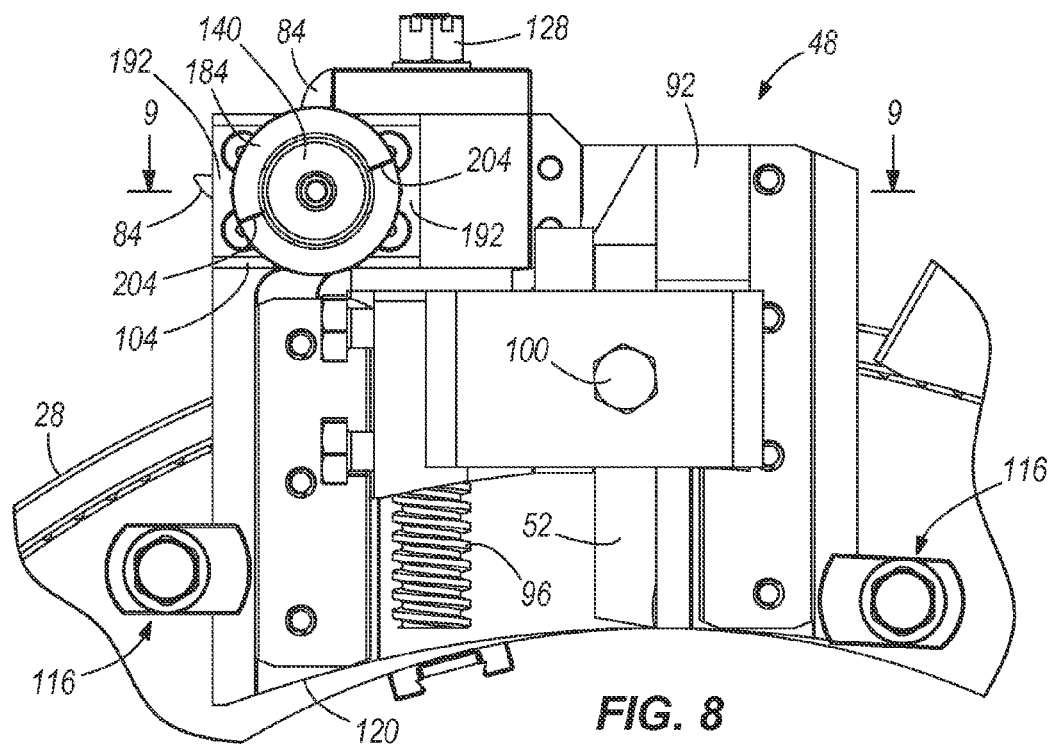
FIG. 8 is an enlarged front view of the tool support of the pipe machining apparatus shown in FIG. 1 with the tool support illustrated in a disengaged position, in accordance with one embodiment.
Figure 9:
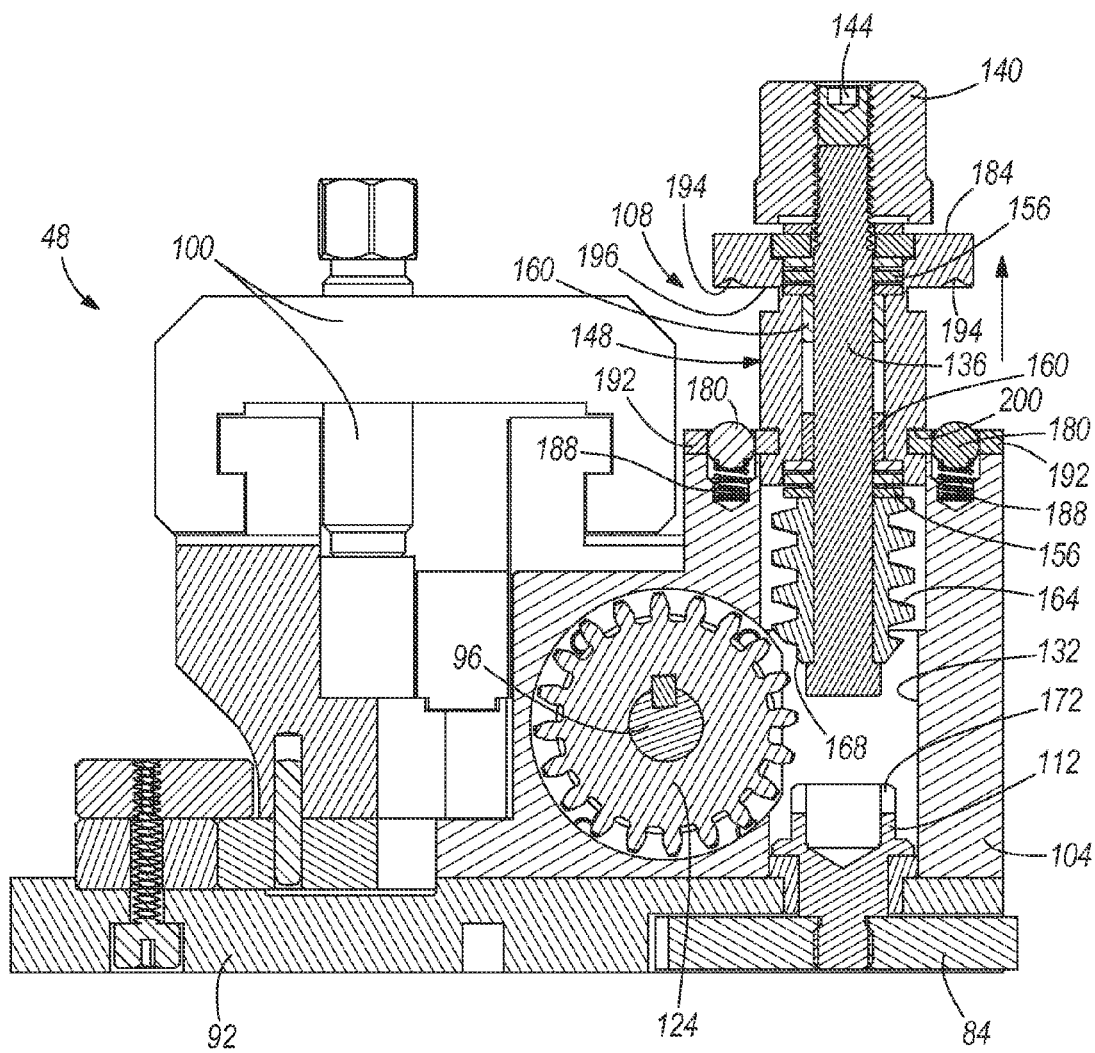
FIG. 9 is a cross-sectional view taken along line 9-9 in FIG. 8 showing the tool support of the pipe machining apparatus in a disengaged position, in accordance with one embodiment.

A second manner of retracting the tool 52 after completion of the pipe machining process exists. This second manner includes moving the worm gear assembly 108 from an engaged position (as shown in FIGS. 4 and 7) to a disengaged position (as shown in FIGS. 8 and 9). With reference to FIGS. 8 and 9, the disengaged position of the worm gear assembly 108 is illustrated and includes moving the worm gear 164 out of engagement with the drive gear 124. To achieve this, a user grasps and twists the flange 184 on the worm gear assembly housing 148 causing the flange 184 to roll along the top of the rollers 180. A first slot 196 defined in the worm gear assembly housing 148 rotates until an inner edge of at least one of the keeper plates 192 is no longer positioned in the first slot 196. Once the keeper plate 192 is no longer positioned in the first slot 196, the worm gear assembly 108 may be pulled upward to the disengaged position shown in FIG. 9. Pulling the worm gear assembly 108 upward disengages the worm gear 164 with the drive gear 124. A second slot 200 is defined in the worm gear assembly housing 148 and the worm gear assembly 108 may be rotated to move at least one of the keeper plates 192 into the second slot 200 to retain the worm gear assembly 108 in the disengaged position. FIGS. 4 and 8 include reference lines 204 on the flange 184 of the worm gear assembly housing 148 to illustrate the orientation of the worm gear assembly 108 in the engaged and disengaged positions and the necessary rotation of the flange 184 to move the assembly 108 between the engaged and disengaged positions.

Upon disengagement of the worm gear 164 with the drive gear 124, the feed screw 96 may be rotated in an opposite direction to retract the tool clamp 100 and the tool 52. A rotary tool (e.g., a power drill) may engage the tool coupling 128 to rotate the feed screw 96 in the opposite direction. Since the drive gear 124 no longer engages the worm gear 164, rotation of the feed screw 96 in the opposite direction will not damage the drive gear 124 or the worm gear 164. Additionally, the large ratio between the worm gear 164 and the drive gear 124 is taken out of play by disengaging the worm gear 164 and the drive gear 124. Thus, the tool 52 and the tool clamp 100 may be retracted at an increment associated with the teeth configuration of the feed screw 96. This increment is significantly larger than the small increment associated with the large gear ratio between the worm gear 164 and the drive gear 124, thereby ensuring quicker retraction of the tool 52 and the tool clamp 100.

The worm gear assembly 108 may be moved back into the engaged position as desired. To achieve this, the housing 148 of the worm gear assembly 108 is rotated to move the keeper plate 192 out of the second slot 200 and the worm gear assembly 108 is then moved into the cavity 132 toward the drive coupling 112. The worm gear 164 interlaces with the teeth of the drive gear 124 and the worm gear assembly 108 is rotated until the key element 168 is positioned in the key feature 172 defined in the drive coupling 112. When the key element 168 moves into the key feature 172, a user presses the flange 184 against the rollers 180 and associated spring force to align the first slot 196 with at least one of the keeper plates 192. The worm gear assembly 108 is then rotated to slide at least one of the keeper plates 192 into the first slot 196 and the rollers 180 seat themselves into the indentations 194 defined in the flange 184. At this point, the worm gear assembly 108 is located in the engaged position and the tool carrier 32 is ready for use.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
a frame;
a tool carrier coupled to and movable relative to the frame; and
a tool support coupled to and movable with the tool carrier relative to the frame, wherein the tool support is adapted to support a tool and move the tool in a first direction toward a pipe at a first increment and move the tool in a second direction away from the pipe at a second increment, the second increment being larger than the first increment;
wherein the tool support further includes a feed screw, a tool clamp adapted to engage the tool and coupled to and movable along the feed screw in both the first and second directions, and a worm gear movable between a first position, in which the worm gear couples to the feed screw, and a second position, in which the worm gear is uncoupled from the feed screw.

2. The pipe machining apparatus of claim 1, wherein the first increment is a first linear distance traveled per a period of time and the second increment is a second linear distance traveled per the same period of time, wherein the second linear distance is greater than the first linear distance.

3. The pipe machining apparatus of claim 1, wherein, with the worm gear in the first position, rotation of the worm gear rotates the feed screw to move the tool in the first direction at the first increment, and wherein, with the worm gear in the second position, rotation of the feed screw independently of the worm gear moves the tool in the second direction at the second increment.

4. The pipe machining apparatus of claim 3, wherein the first increment is a first linear distance traveled by the tool as a result of a single rotation of the worm gear, and wherein the second increment is a second linear distance traveled by the tool as a result of a single rotation of the feed screw, the second linear distance being larger than the first linear distance.

5. The pipe machining apparatus of claim 1, wherein the feed screw rotates about a first axis and the worm gear rotates about a second axis transverse to the first axis, and wherein the worm gear is moved along the second axis between the first position and the second position.

6. The pipe machining apparatus of claim 1, further comprising a drive coupling including a key feature, and wherein the worm gear includes a key element adapted to couple with the key feature of the drive coupling to couple the worm gear to the drive coupling with the worm gear in the first position, and wherein the worm gear and the drive coupling rotate together when coupled.

7. The pipe machining apparatus of claim 6, wherein the key element is uncoupled from the key feature when the worm gear is in the second position, and wherein the worm gear and drive coupling are adapted to rotate independently of each other when uncoupled.

8. The pipe machining apparatus of claim 1, further comprising a worm gear housing coupled to the worm gear, wherein the worm gear housing is rotatable between a first housing position, in which the worm gear is secured in the first position, and a second housing position, in which the worm gear is capable of moving between the first position and the second position.

9. The pipe machining apparatus of claim 8, wherein the tool support further includes a retainer plate, and wherein the worm gear housing defines a slot therein adapted to receive the retainer plate when the worm gear housing is in the first housing position, and wherein the slot does not receive the retainer plate therein when the worm gear housing is in the second housing position.

10. A method of operating a pipe machining apparatus, the method comprising:
fixedly coupling a frame of the pipe machining apparatus to a pipe;
moving a tool carrier relative to the frame, wherein the tool carrier is moveably coupled to the frame;
advancing a tool coupled to the tool carrier toward the pipe at a first increment;
retracting the tool away from the pipe at a second increment larger than the first increment; and
moving a worm gear to a first position in which the worm gear couples with a feed screw, wherein the feed screw is coupled to the tool, and wherein advancing a tool further comprises rotating the worm gear to rotate the feed screw and advance the tool toward the pipe at the first increment.

11. The method of claim 10, further comprising moving the worm gear to a second position in which the worm gear is uncoupled from the feed screw, and wherein retracting the tool further comprises rotating the feed screw independently of the worm gear to retract the tool away from the pipe at the second increment.

12. The method of claim 11, wherein the first increment is a first linear distance traveled as a result of a single rotation of the worm gear, and wherein the second increment is a second linear distance traveled as a result of a single rotation of the feed screw, the second linear distance being larger than the first linear distance.

13. A tool support for a pipe machining apparatus, the tool support comprising:
a rotatable feed screw;
a tool clamp coupled to the feed screw and adapted to support a tool, wherein the tool clamp is movable along the feed screw to move the tool in a first tool direction and a second tool direction; and
a worm gear movable between a first position, in which the worm gear couples with the feed screw and rotation of the worm gear in a first worm gear direction rotates the feed screw to move the tool in the first tool direction and rotation of the worm gear in a second worm gear direction rotates the feed screw to move the tool in the second tool direction, and a second position, in which the worm gear is uncoupled from the feed screw and the feed screw is rotatable independently of the worm gear.

14. The tool support of claim 13, wherein a drive gear is fixedly coupled to and rotates with the feed screw, and wherein the worm gear engages the drive gear in the first position and does not engage the drive gear in the second position.

15. The tool support of claim 13, wherein the tool moves at a first increment in the first and second tool directions when the worm gear is in the first position, and wherein the tool moves at a second increment in the second tool direction when the worm gear is in the second position, the second increment being larger than the first increment.

16. The tool support of claim 15, wherein the first increment is a first linear distance traveled by the tool as a result of a single rotation of the worm gear, and wherein the second increment is a second linear distance traveled by the tool as a result of a single rotation of the feed screw, the second linear distance being larger than the first linear distance.

17. The tool support of claim 13, further comprising a drive coupling including a key feature, and wherein the worm gear includes a key element adapted to couple with the key feature of the drive coupling to couple the worm gear to the drive coupling with the worm gear in the first position, and wherein the worm gear and the drive coupling rotate together when coupled.

18. The tool support of claim 17, wherein the key element is uncoupled from the key feature when the worm gear is in the second position, and wherein the worm gear and drive coupling rotate independently of each other when uncoupled.

* * * * *